United States Patent
Liu et al.

(10) Patent No.: US 12,093,553 B2
(45) Date of Patent: Sep. 17, 2024

(54) METHOD, DEVICE, AND COMPUTER PROGRAM PRODUCT FOR MANAGING MACHINE LEARNING MODEL

(71) Applicant: EMC IP Holding Company LLC, Hopkinton, MA (US)

(72) Inventors: Jinpeng Liu, Shanghai (CN); Jiacheng Ni, Shanghai (CN); Qiang Chen, Shanghai (CN); Danqing Sha, Shanghai (CN); Zhen Jia, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 788 days.

(21) Appl. No.: 17/320,392

(22) Filed: May 14, 2021

(65) Prior Publication Data
US 2022/0343209 A1    Oct. 27, 2022

(30) Foreign Application Priority Data
Apr. 23, 2021    (CN) .......................... 202110442312.8

(51) Int. Cl.
*G06F 3/06*    (2006.01)
*G06F 8/65*    (2018.01)
(Continued)

(52) U.S. Cl.
CPC ............ *G06F 3/0647* (2013.01); *G06F 3/067* (2013.01); *G06F 3/0679* (2013.01); *G06F 8/65* (2013.01);
(Continued)

(58) Field of Classification Search
CPC ...... G06F 3/067; G06F 3/0679; G06F 3/0647; G06F 12/0261; G06F 12/0862; G06F 8/65; G06Q 10/06316; G06N 20/00
See application file for complete search history.

(56) References Cited

U.S. PATENT DOCUMENTS 6,324,549 B1 * 11/2001 Gomi .................. G06F 12/0261
10,642,505 B1 * 5/2020 Kuzmin ................ G06F 3/0679
(Continued)

OTHER PUBLICATIONS

K. Zhang et al., "Machine Learning-Based Temperature Prediction for Runtime Thermal Management Across System Components," IEEE Transactions on Parallel and Distributed Systems, Feb. 1, 2018, pp. 405-419, vol. 29, No. 2.
(Continued)

*Primary Examiner* — Tuan A Vu
(74) *Attorney, Agent, or Firm* — Ryan, Mason & Lewis, LLP (57) ABSTRACT

A method includes determining a first instance of a current version for a machine learning model and a second instance of an upgraded version for the machine learning model, the first instance executing a service for processing data; adjusting respectively, if it is determined that the service is to be migrated from the first instance to the second instance, a first allocation policy for storage space of the first instance and a second allocation policy for storage space of the second instance to a first target policy and a second target policy, wherein the first target policy is used to phase out storage space and the second target policy is used to phase in storage space; reclaiming allocated storage space for the first instance based on the first target policy; and allocating required storage space for the second instance based on the second target policy to realize migration of the service.

20 Claims, 4 Drawing Sheets

(51) Int. Cl.
*G06N 20/00* (2019.01)
*G06F 12/02* (2006.01)
*G06F 12/0862* (2016.01)
*G06Q 10/0631* (2023.01)

(52) U.S. Cl.
CPC ......... *G06N 20/00* (2019.01); *G06F 12/0261* (2013.01); *G06F 12/0862* (2013.01); *G06Q 10/06316* (2013.01)

(56) References Cited

U.S. PATENT DOCUMENTS

| | | | |
|---|---|---|---|
| 11,327,676 B1* | 5/2022 | Fernandez | G06F 12/0862 |
| 2008/0209043 A1* | 8/2008 | Ajiro | G06F 3/067 |
| | | | 709/226 |
| 2018/0247241 A1* | 8/2018 | Avrahami | G06Q 10/06316 |
| 2019/0324810 A1 | 10/2019 | Zhao et al. | |
| 2020/0334083 A1 | 10/2020 | Liu et al. | |
| 2020/0342272 A1 | 10/2020 | Lin et al. | |

OTHER PUBLICATIONS spark.apache.org, "Clustering—RDD-Based API," http://spark.apache.org/docs/latest/mllib-clustering.html, downloaded Jun. 27, 2019, 20 pages.
S. Ahmad et al., "Unsupervised Real-Time Anomaly Detection for Streaming Data," Neurocomputing, Apr. 22, 2017, pp. 134-147.
Wikipedia Contributors, "Deep Learning," Wikipedia, The Free Encyclopedia, https://en.wikipedia.org/w/index.php?title=Deep_learning&oldid=907716010, Jul. 24, 2019, 26 pages.
Wikipedia Contributors, "Everything as a Service," Wikipedia, The Free Encyclopedia, https://simple.wikipedia.org/w/index.php?title=Everything_as_a_service&oldid=6536463, May 13, 2019, 2 pages.
U.S. Appl. No. 16/805,065 filed in the name of Ruixue Zhang et al. on Feb. 28, 2020, and entitled "Method, Devices, and Computer Program Product for Model Adaptation."
U.S. Appl. No. 16/936,813 filed in the name of Jin Li et al. on Jul. 23, 2020, and entitled "Method, Device, and Storage Medium for Deploying Machine Learning Model."
U.S. Appl. No. 17/189,993 filed in the name of Jinpeng Liu et al. on Mar. 2, 2021, and entitled "Method, Device, and Computer Program Product for Updating Machine Learning Model."

* cited by examiner

METHOD, DEVICE, AND COMPUTER PROGRAM PRODUCT FOR MANAGING MACHINE LEARNING MODEL

RELATED APPLICATION(S)

The present application claims priority to Chinese Patent Application No. 202110442312.8, filed Apr. 23, 2021, and entitled "Method, Device, and Computer Program Product for Managing Machine Learning Model," which is incorporated by reference herein in its entirety.

FIELD

Embodiments of the present disclosure relate to the field of artificial intelligence and the field of the Internet of Things, and more specifically, to a method, a device, and a computer program product for managing a machine learning model.

BACKGROUND

With development of computer technologies in recent years, the Internet of Things (IoT) has been increasingly applied in various aspects of people's lives. A core in the Internet of Things technology is analysis of data obtained from Internet of Things devices (e.g., various temperature sensors, position sensors, image sensors, meters, etc.), and these sensor data can be used to implement corresponding intelligent control functions based on technologies related to artificial intelligence. In order to implement intelligent control functions, it is necessary, for example, to upgrade a version of a machine learning model. Future data is then processed by using the upgraded machine learning model. However, there are still many problems to be solved in the process of upgrading the machine learning model.

SUMMARY

Embodiments of the present disclosure provide a method, a device, and a computer program product for updating a machine learning model.

According to a first aspect of the present disclosure, a method for managing a machine learning model is provided. The method includes determining a first instance of a current version for the machine learning model and a second instance of an upgraded version for the machine learning model, the first instance executing a service for processing data. The method further includes adjusting respectively, if it is determined that the service is to be migrated from the first instance to the second instance, a first allocation policy for storage space of the first instance and a second allocation policy for storage space of the second instance to a first target policy and a second target policy, where the first target policy is used to phase out storage space and the second target policy is used to phase in storage space. The method further includes reclaiming allocated storage space for the first instance based on the first target policy. The method further includes allocating required storage space for the second instance based on the second target policy to realize migration of the service.

According to a second aspect of the present disclosure, an electronic device is provided. The electronic device includes at least one processor; and a memory coupled to the at least one processor and storing thereon instructions that, when executed by the at least one processor, cause the device to perform actions, the actions comprising: determining a first instance of a current version for the machine learning model and a second instance of an upgraded version for the machine learning model, the first instance executing a service for processing data; adjusting respectively, if it is determined that the service is to be migrated from the first instance to the second instance, a first allocation policy for storage space of the first instance and a second allocation policy for storage space of the second instance to a first target policy and a second target policy, wherein the first target policy is used to phase out storage space and the second target policy is used to phase in storage space; reclaiming allocated storage space for the first instance based on the first target policy; and allocating required storage space for the second instance based on the second target policy to realize migration of the service.

According to a third aspect of the present disclosure, a computer program product is provided, which is tangibly stored on a non-volatile computer-readable medium and includes machine-executable instructions. The machine-executable instructions, when executed, cause a machine to perform steps of the method in the first aspect of the present disclosure.

BRIEF DESCRIPTION OF THE DRAWINGS

The above and other objectives, features, and advantages of the present disclosure will become more apparent from the following description of example embodiments of the present disclosure, to be viewed with reference to the accompanying drawings, and in the example embodiments of the present disclosure, the same reference numerals generally represent the same components.

The same or corresponding reference numerals in the various drawings represent the same or corresponding portions.

DETAILED DESCRIPTION

The embodiments of the present disclosure will be described in more detail below with reference to the accompanying drawings. Although some embodiments of the present disclosure are illustrated in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and embodiments of the present disclosure are for illustrative purposes only, and are not intended to limit the scope of protection of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be construed as "at least one embodiment." The terms "first," "second," and the like may refer to different or the same objects. Other explicit and implicit definitions may also be included below.

The principles of the present disclosure will be described below with reference to several example embodiments shown in the accompanying drawings. Although illustrative embodiments of the present disclosure are shown in the accompanying drawings, it should be understood that these embodiments are described only to enable those skilled in the art to better understand and then implement the present disclosure, and are not intended to impose any limitation to the scope of the present disclosure.

As used herein, "machine learning" refers to processing involving high-performance computing, machine learning, and artificial intelligence algorithms. Herein, the term "machine learning model" may also be referred to as a "learning model," "learning network," "network model," or "model." A "neural network" or "neural network model" is a deep learning model. In general, a machine learning model is capable of receiving input data, performing predictions based on the input data, and outputting prediction results.

When running a machine learning model on a computing device, a default policy and two dynamic storage space allocation policies are usually set for the operation of the machine learning model. The default policy is to allocate all storage space on the device running the machine learning model to the machine learning model. The first dynamic allocation policy ALLOW_GROWTH is an on-demand allocation policy. At this time, the storage space is allocated according to the demands of the machine learning model, so the allocated storage space is gradually increasing. The second dynamic allocation policy MEMORY_LIMIT is a policy for allocating a predetermined size of storage space. The predetermined size of storage space has been allocated for use by the machine learning model from the beginning of the model operation. If the storage space is not enough, part of the allocated storage space has to be released to meet subsequent demands.

Because some machine learning models need to provide services to users without interruption during operation, version upgrading of machine learning models cannot stop providing services to users. At this time, two instances of the machine learning model need to be run. One instance has the version N and the other instance has the version N+1, where N is a positive integer. Then, services are seamlessly migrated between the two instances.

During the uninterrupted upgrading, both instances are running simultaneously. Since both instances are running with the current resource management policy (the default policy or the first dynamic allocation policy ALLOW_GROWTH or the second dynamic allocation policy MEMORY_LIMIT), at this time, resources must be doubled to accommodate two resource replications of the two instances.

In the default policy, all storage space in the memory of the device running the machine learning model is visible to the machine learning model, that is, all storage space is allocated to the machine learning model for use. For example, when the machine learning model runs on a graphics processing unit, all the storage space of the memory in the graphics processing unit is allocated to the machine learning model. In the first dynamic allocation policy ALLOW_GROWTH, this policy does not indicate reclaiming of allocated resources, but only allocates storage space according to the needs of the machine learning model, so the allocated storage space will continue to increase. For the second dynamic allocation policy MEMORY_LIMIT, this policy instructs to allocate a predetermined size of storage space to the machine learning model for the model to use.

However, when the default policy is applied, there will be no available storage space for new incoming instances. When the first dynamic allocation policy ALLOW_GROWTH is applied, the cost will be relatively high because the allocated storage space continuously increases. Sometimes because too much storage space resources have been allocated, there are not enough storage space resources available for new incoming instances. When the second dynamic allocation policy MEMORY_LIMIT is used, since the predetermined size is always set to meet the maximum storage space requirement of the machine learning model, there will be a small storage space margin at this time. Therefore, there is not enough memory space for new incoming instances.

In order to solve the above and other potential problems, an embodiment of the present disclosure provides a method for managing a machine learning model. In this method, a computing device first determines a first instance of a current version for the machine learning model and a second instance of an upgraded version for the machine learning model. At this time, the first instance is executing a service for processing data. When the service is migrated from the first instance to the second instance, a first allocation policy for storage space of the first instance and a second allocation policy for storage space of the second instance need to be adjusted respectively to a first target policy and a second target policy, where the first target policy is used to phase out storage space and the second target policy is used to phase in storage space. Then, the first target policy is used to reclaim the allocated storage space of the first instance, and the second target policy is used to allocate the required storage space for the second instance to implement service migration. By means of the method, upgrading of the machine learning model can be realized by using limited storage space, thereby reducing upgrading cost, improving efficiency, and improving user experience.

Figure 1:
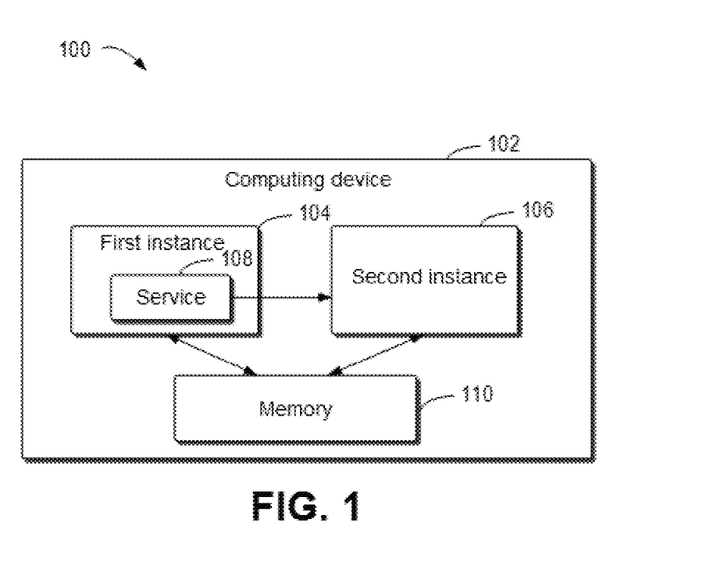
FIG. 1 illustrates a schematic diagram of example environment 100 in which a device and/or method according to an embodiment of the present disclosure may be implemented.

The embodiments of the present disclosure will be further described below in detail with reference to the accompanying drawings. FIG. 1 shows a block diagram of example environment 100 in which the embodiments of the present disclosure can be implemented.

Example environment 100 includes computing device 102. Computing device 102 is used to manage the operation of the machine learning model and the upgrading of the machine learning model.

Computing device 102 includes, but is not limited to, a personal computer, a server computer, a handheld or laptop device, a mobile device (such as a mobile phone, a personal digital assistant (PDA), and a media player), a multi-processor system, a consumer electronic product, a minicomputer, a mainframe computer, a distributed computing environment including any of the above systems or devices, etc.

Computing device 102 runs first instance 104 of a current version of the machine learning model and second instance 106 of the upgraded version of the machine learning model.

Computing device 102 needs to migrate data processing service 108 from first instance 104 to second instance 106 in order to use second instance 106 to run data processing service 108 after the upgrading is successful.

Both first instance 104 and second instance 106 obtain allocated storage space from memory 110. It is shown in FIG. 1 that memory 110 is located in computing device 102, which is only an example, rather than a specific limitation to the present disclosure. In some embodiments, memory 110 may be located on any suitable device, for example, located on a graphics processing unit.

First instance 104 and second instance 106 in computing device 102 each have a corresponding storage space allocation policy, such as one of a default policy, an ALLOW_GROWTH policy, and a MEMORY_LIMIT policy. At the beginning of the upgrading process, computing device 102 notifies first instance 104 and second instance 106 of the start of the upgrading. Then, the two instances save their corresponding storage space allocation policies. Then, the storage space allocation policy of the first instance is adjusted to the first target policy, and the first target policy is used to phase out the storage space. The storage space allocation policy of the second instance is adjusted to the second target policy, and the second target policy is used to phase in the storage space. The change process of the storage space used by two different instances can be seen in FIG. 2, where FIG. 2 illustrates a schematic diagram of example 200 of storage space allocated by a machine learning model during upgrading according to an embodiment of the present disclosure.

Figure 2:
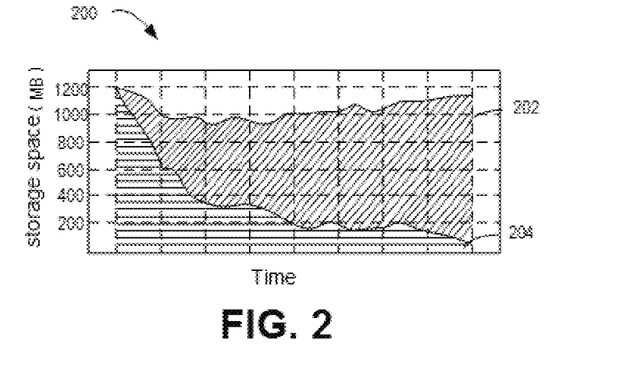
FIG. 2 illustrates a schematic diagram of example 200 of storage space allocated by a machine learning model during upgrading according to an embodiment of the present disclosure.

As shown in FIG. 2, first hatched area 204 corresponds to the size of the storage space of first instance 104. As the upgrading progresses, the used storage space becomes smaller and smaller. Second hatched area 202 corresponds to the storage space size of second instance 106, and as the upgrading progresses, more and more storage space is obtained. It can be seen that the machine learning model can be upgraded with a predetermined amount of storage space.

Returning now to FIG. 1, after migrating the data processing service 108 from the first instance 104 to the second instance 106, the storage space allocation policy of the first instance and the second instance can be restored to the previous storage space allocation policy.

In some embodiments, if the upgrading is unsuccessful, an instance corresponding to version N+1 can be used as the first instance, an instance of version N can be used as the second instance, and the service will be transferred back to the version previous to upgrading. The above examples are only for describing the present disclosure, rather than specifically limiting the present disclosure.

By means of the method, upgrading of the machine learning model can be realized by using limited storage space, thereby reducing upgrading cost, improving efficiency, and improving user experience.

The foregoing describes, with reference to FIGS. 1 and 2, example environment 100 in which an embodiment of the present disclosure can be implemented. The following describes, with reference to FIG. 3, a flow chart of method 300 for managing a machine learning model according to an embodiment of the present disclosure. Method 300 may be executed at computing device 102 in FIG. 1 or any suitable computing device.

Figure 3:
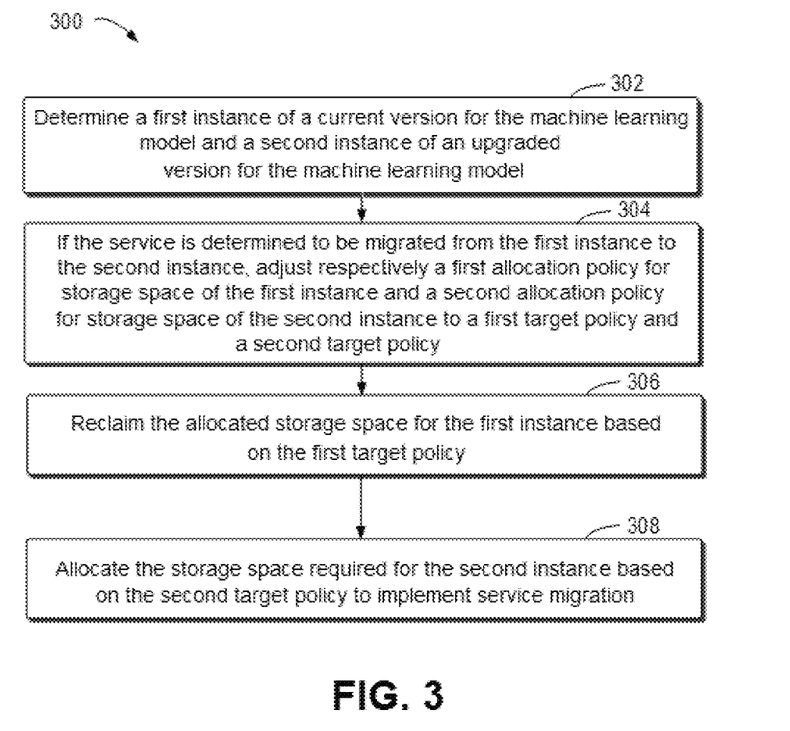
FIG. 3 illustrates a flow chart of method 300 for managing a machine learning model according to an embodiment of the present disclosure.

As shown in FIG. 3, at block 302, computing device 102 determines a first instance of a current version for the machine learning model and a second instance of an upgraded version for the machine learning model, where the first instance is executing a service for processing data. Computing device 102 runs two instances of the machine learning model, and implements uninterrupted transfer of services between the two services by means of the following operations.

At block 304, if the service is determined to be migrated from the first instance to the second instance, a first allocation policy for storage space of the first instance and a second allocation policy for storage space of the second instance need to be adjusted respectively to a first target policy and a second target policy, where the first target policy is used to phase out storage space and the second target policy is used to phase in storage space.

In some embodiments, computing device 102 first determines a first allocation policy set by a user for the first instance and a second allocation policy set for the second instance. Then, computing device 102 adjusts the first allocation policy of the first instance to a first target policy, and adjusts the second allocation policy of the second instance to a second target policy. By means of this method, the policy adjustment can be realized quickly.

At block 306, computing device 102 reclaims the allocated storage space for the first instance based on the first target policy. After determining that its storage space allocation policy is the first target policy, the first instance running in computing device 102 starts to apply the first target policy to reclaim storage space.

In some embodiments, the first target policy instructs the computing device to perform the following operations. First, computing device 102 is made to determine a sequence of nodes corresponding to operations associated with the machine learning model, the nodes being sorted according to an order of the corresponding operations. Then, computing device 102 determines a current node corresponding to an operation being executed in the first instance. Computing device 102 determines a previous node previous to the current node from the sequence. At this time, computing device 102 reclaims storage space for the operation corresponding to the previous node in the first instance. In this way, the storage space can be reclaimed quickly and effectively. For an example of the node sequence, refer to the node sequence shown in FIG. 4, where FIG. 4 illustrates a schematic diagram of example 400 of a node sequence according to an embodiment of the present disclosure.

Figure 4:
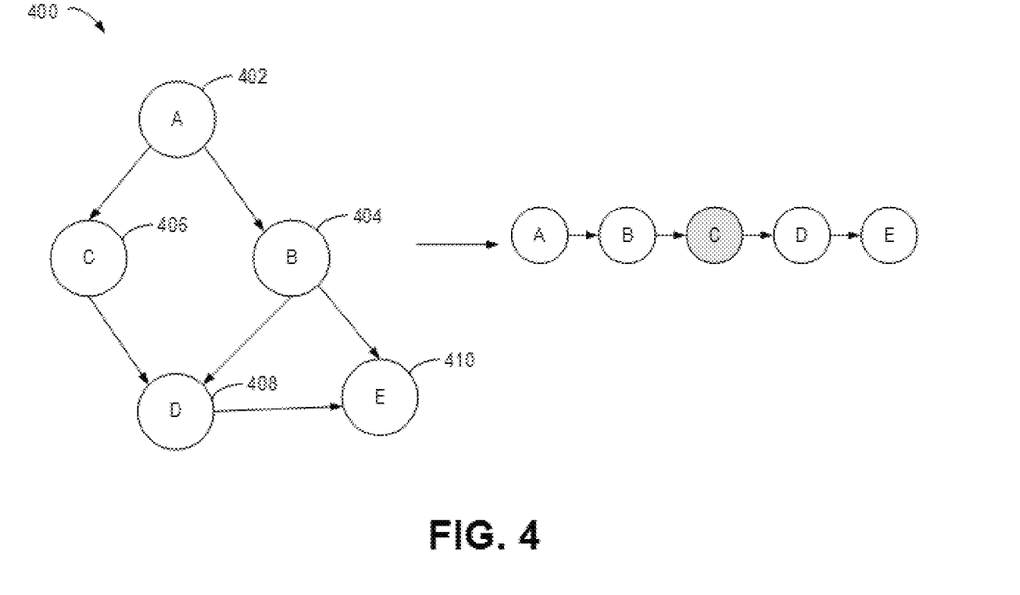
FIG. 4 illustrates a schematic diagram of example 400 of a node sequence according to an embodiment of the present disclosure.

As shown in FIG. 4, the operations in the machine learning model can be used to form a node graph for the operations, and each node corresponds to an operation in the machine learning model. For example, the machine learning model of example 400 has node A 402, node B 404, node C 406, node D 408, and node E 410. The edges between nodes are formed according to an association relationship between the operations corresponding to the nodes. For example, the output of node A 402 is the input of node B 404 and node C 406. Therefore, a sequence of nodes can be formed according to the execution order: node A 402, node B 404, node C 406, node D 408, and node E 410. If the operation corresponding to node C 406 is currently being executed, it indicates that the operations on node A and node B have been completed, and the storage space of the operations corresponding to the two nodes can be reclaimed, such as the storage space allocated to the corresponding operation program and data.

In some embodiments, after completing computation of a current node, storage space for the operation corresponding to the current node in a first instance is reclaimed. By means of this method, the currently used storage space can be quickly reclaimed. As shown in FIG. 4, after the operation corresponding to node C is completed, the storage space of the operation corresponding to node C can be reclaimed.

Returning now to FIG. 3, at block 308, the storage space required for the second instance is allocated based on the second target policy to implement service migration.

In some embodiments, if it is determined that the second allocation policy for the second instance is a policy for allocating storage space according to needs of an instance, computing device 102 allocates the required storage space to the second instance by using the second allocation policy as the second target policy. In some embodiments, if the second allocation policy is the default policy of allocating all storage space of the memory to the second instance, the policy of allocating storage space according to the needs of the instance is applied to the second instance. If it is determined that the second allocation policy for the second instance is a policy for allocating storage space of a predetermined size to an instance, computing device 102 needs to determine allocation of the required storage space based on the allocated storage space for the second instance and the required storage space. In this way, appropriate storage space can be allocated to the second instance reasonably and quickly.

In some embodiments, when the second allocation policy for the second instance is a policy of allocating a predetermined size of storage space for an instance, computing device 102 needs to compare the sum of the size of the storage space allocated to the machine learning model and a size of required storage space with a predetermined size. If the sum of the size of the storage space allocated to the machine learning model and the size of the required storage space is smaller than or equal to the predetermined size, the required storage space is allocated to the second instance. If the sum of the size of the allocated storage space and the size of the required storage space is larger than the predetermined size, at least part of the allocated storage space is released for the required storage space to ensure that the storage space allocated to the machine learning model does not exceed the predetermined size. In this way, appropriate storage space can be allocated to the second instance.

In some embodiments, if it is determined that the migration is completed, computing device 102 replaces the first target policy with the first allocation policy for use by the first instance, and replaces the second target policy with the second allocation policy for use by the second instance. In this way, the policy set by the user can be quickly restored.

By means of the method, upgrading of the machine learning model can be realized by using limited storage space, thereby reducing upgrading cost, improving efficiency, and improving user experience.

The above describes, with reference to FIGS. 3 and 4, a method for managing a machine learning model according to an embodiment of the present disclosure. The following describes, with reference to FIG. 5, a flow chart of method 500 for managing a machine learning model according to an embodiment of the present disclosure. Method 500 can be executed at computing device 102 in FIG. 1 and any suitable computing device.

Figure 5:
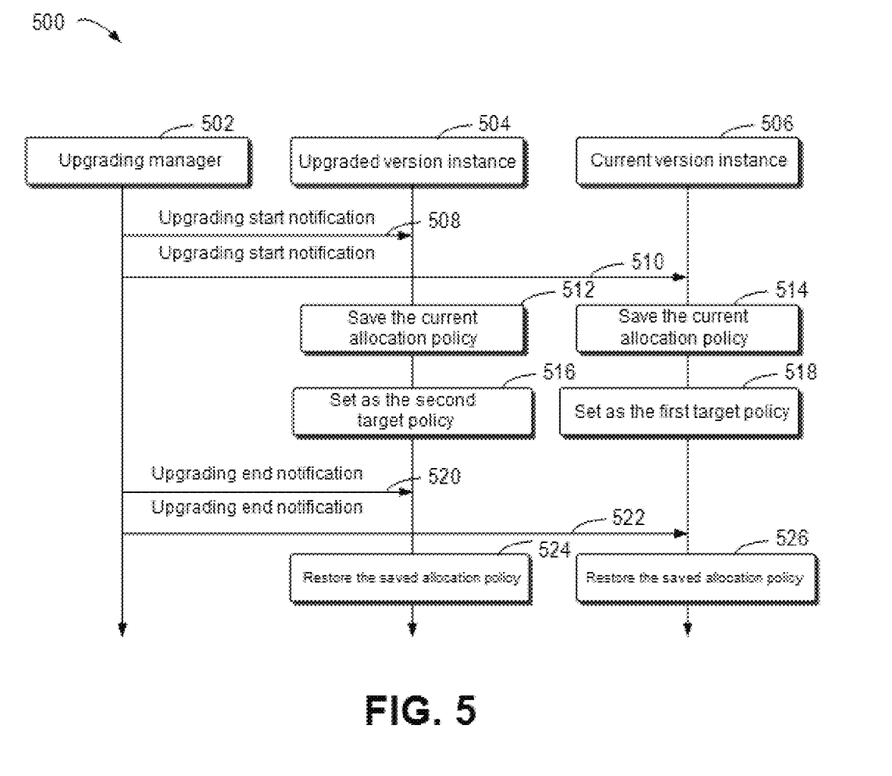
FIG. 5 illustrates a schematic diagram of method 500 for upgrading a machine learning model according to an embodiment of the present disclosure.

As shown in FIG. 5, when it is determined to upgrade the machine learning model, upgrading manager 502 will send 508 and 510 upgrade start notifications to upgraded version instance 504 and current version instance 506 of the machine learning model, respectively. Upgraded version instance 504 then saves the current allocation policy of the storage space at block 512, and then sets the allocation policy of the storage space as the second target policy at block 516. Similarly, after receiving an upgrading notification, current version instance 506 saves the current allocation policy of the storage space at block 514, and then sets the allocation policy of the storage space as the first target policy at block 518. After the upgrading is completed, upgrade manager 502 sends 520 and 522 upgrading end notifications to upgraded version instance 504 and current version instance 506, respectively.

After receiving the upgrade end notification, upgraded version instance 504 restores the saved allocation policy at block 524, and current version instance 506 restores the saved allocation policy at block 526.

By means of the method, upgrading of the machine learning model can be realized by using limited storage space, thereby reducing upgrading cost, improving efficiency, and improving user experience.

Figure 6:
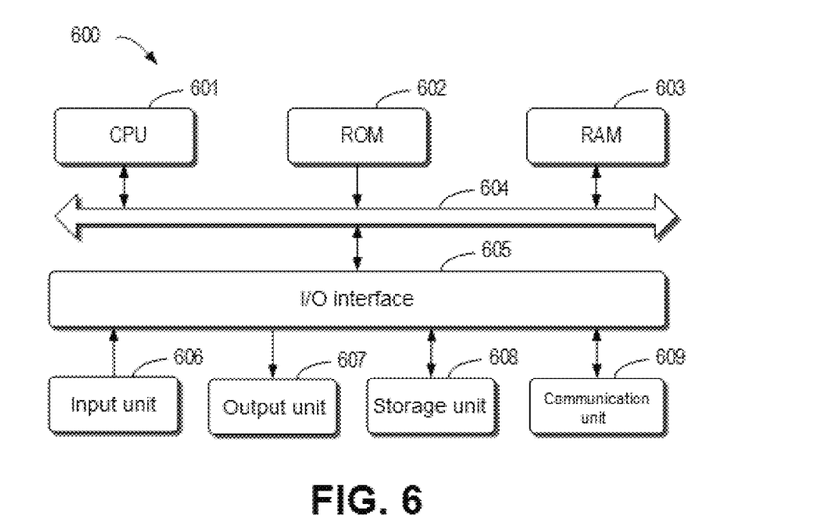
FIG. 6 illustrates a schematic block diagram of example device 600 applicable to implement an embodiment of the content of the present disclosure.

FIG. 6 illustrates a schematic block diagram of example device 600 that can be used to implement the embodiments of the present disclosure. Computing device 102 in FIG. 1 can be implemented using device 600. As shown in the drawing, device 600 includes central processing unit (CPU) 601 that may perform various appropriate actions and processing according to computer program instructions stored in read-only memory (ROM) 602 or computer program instructions loaded from storage unit 608 into random access memory (RAM) 603. In RAM 603, various programs and data required for operations of device 600 may also be stored. CPU 601, ROM 602, and RAM 603 are connected to each other through bus 604. Input/output (I/O) interface 605 is also connected to bus 604.

Multiple components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices over a computer network such as an Internet and/or various telecommunication networks.

Various processes and processing described above, e.g., methods 300 and 500, may be executed by CPU 601. For example, in some embodiments, methods 300 and 500 may be embodied as a computer software program that is tangibly included in a machine-readable medium, such as storage unit 608. In some embodiments, part or all of the computer program may be loaded and/or installed onto device 600 via ROM 602 and/or communication unit 609. When the computer program is loaded into RAM 603 and executed by CPU 601, one or more actions of methods 300 and 500 described above may be executed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, state setting data, or source code or object code written in any combination of one or more programming languages, the programming languages including an object oriented programming language, such as Smalltalk, C++, and the like, and conventional procedural programming languages, such as the "C" language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing state information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product implemented according to the embodiments of the present disclosure. It should be understood that each block of the flow charts and/or block diagrams and combinations of blocks in the flow charts and/or block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms as used herein is intended to best explain the principles and practical applications of the various embodiments or technical improvements to technologies on the market, and to otherwise enable persons of ordinary skill in the art to understand the embodiments disclosed here.

What is claimed is:

1. A method for managing a machine learning model, comprising:
   determining a first instance of a current version for the machine learning model and a second instance of an upgraded version for the machine learning model, the first instance executing a service for processing data, wherein the first instance and the second instance are configured to run at least in part concurrently with one another on one or more graphics processing units to provide uninterrupted access to the service for processing data using one of the first instance and the second instance in conjunction with migration of the service from the first instance to the second instance;

adjusting respectively, if determining that the service is to be migrated from the first instance to the second instance, a first allocation policy for storage space of the first instance and a second allocation policy for storage space of the second instance to a first target policy and a second target policy, wherein the first target policy is used to phase out storage space and the second target policy is used to phase in storage space;

reclaiming allocated storage space for the first instance based on the first target policy; and allocating required storage space for the second instance based on the second target policy to realize migration of the service;

wherein the storage space comprises memory resources of the one or more graphics processing units;

wherein the first target policy is more restrictive with regard to usage of the memory resources of the one or more graphics processing units than the first allocation policy; and wherein the second target policy is less restrictive with regard to usage of the memory resources of the one or more graphics processing units than the first target policy.

2. The method according to claim 1, wherein adjusting the first allocation policy and the second allocation policy to the first target policy and the second target policy respectively comprises:

determining a first allocation policy for the first instance and a second allocation policy for the second instance;

adjusting the first allocation policy of the first instance as the first target policy; and adjusting the second allocation policy of the second instance as the second target policy.

3. The method according to claim 1, further comprising: if determining that the migration is completed, replacing the first target policy with the first allocation policy for use by the first instance; and replacing the second target policy with the second allocation policy for use by the second instance.

4. The method according to claim 1, wherein reclaiming allocated storage space for the first instance comprises:

determining a sequence of nodes corresponding to operations associated with the machine learning model, the nodes being sorted according to an order of the corresponding operations;

determining a current node corresponding to an operation being executed in the first instance;

determining, from the sequence, a previous node previous to the current node; and reclaiming storage space for the operation corresponding to the previous node in the first instance.

5. The method according to claim 4, wherein reclaiming allocated storage space for the first instance further comprises:

reclaiming, after completing calculation of the current node, the storage space for the operation corresponding to the current node in the first instance.

6. The method according to claim 1, wherein allocating required storage space for the second instance comprises:

allocating, if determining that the second allocation policy for the second instance is a policy for allocating storage space according to needs of an instance, the required storage space to the second instance by using the second allocation policy as the second target policy; and determining, if determining that the second allocation policy for the second instance is a policy for allocating storage space of a predetermined size to an instance, allocation of the required storage space based on the allocated storage space for the second instance and the required storage space.

7. The method according to claim 6, wherein determining allocation of the required storage space comprises:

allocating, if determining that the sum of the size of the allocated storage space and the size of the required storage space is smaller than or equal to the predetermined size, the required storage space to the second instance; and releasing, if determining that the sum of the size of the allocated storage space and the size of the required storage space is larger than the predetermined size, at least part of the allocated storage space for the required storage space.

8. An electronic device, comprising:

at least one processing unit; and at least one memory coupled to the at least one processing unit and storing machine-executable instructions that, when executed by the at least one processing unit, cause the electronic device to perform actions, the actions comprising:

determining a first instance of a current version for a machine learning model and a second instance of an upgraded version for the machine learning model, the first instance executing a service for processing data, wherein the first instance and the second instance are configured to run at least in part concurrently with one another on one or more graphics processing units to provide uninterrupted access to the service for processing data using one of the first instance and the second instance in conjunction with migration of the service from the first instance to the second instance;

adjusting respectively, if determining that the service is to be migrated from the first instance to the second instance, a first allocation policy for storage space of the first instance and a second allocation policy for storage space of the second instance to a first target policy and a second target policy, wherein the first target policy is used to phase out storage space and the second target policy is used to phase in storage space;

reclaiming allocated storage space for the first instance based on the first target policy; and allocating required storage space for the second instance based on the second target policy to realize migration of the service;

wherein the storage space comprises memory resources of the one or more graphics processing units;

wherein the first target policy is more restrictive with regard to usage of the memory resources of the one or more graphics processing units than the first allocation policy; and wherein the second target policy is less restrictive with regard to usage of the memory resources of the one or more graphics processing units than the first target policy.

9. The electronic device according to claim 8, wherein adjusting the first allocation policy and the second allocation policy to the first target policy and the second target policy respectively comprises:
   determining a first allocation policy for the first instance and a second allocation policy for the second instance;
   adjusting the first allocation policy of the first instance as the first target policy; and
   adjusting the second allocation policy of the second instance as the second target policy.

10. The electronic device according to claim 8, wherein the actions further comprise:
   if determining that the migration is completed,
   replacing the first target policy with the first allocation policy for use by the first instance; and
   replacing the second target policy with the second allocation policy for use by the second instance.

11. The electronic device according to claim 8, wherein reclaiming allocated storage space for the first instance comprises:
   determining a sequence of nodes corresponding to operations associated with the machine learning model, the nodes being sorted according to an order of the corresponding operations;
   determining a current node corresponding to an operation being executed in the first instance;
   determining, from the sequence, a previous node previous to the current node; and
   reclaiming storage space for the operation corresponding to the previous node in the first instance.

12. The electronic device according to claim 11, wherein reclaiming allocated storage space for the first instance further comprises:
   reclaiming, after completing calculation of the current node, the storage space for the operation corresponding to the current node in the first instance.

13. The electronic device according to claim 8, wherein allocating required storage space for the second instance comprises:
   allocating, if determining that the second allocation policy for the second instance is a policy for allocating storage space according to needs of an instance, the required storage space to the second instance by using the second allocation policy as the second target policy; and
   determining, if determining that the second allocation policy for the second instance is a policy for allocating storage space of a predetermined size to an instance, allocation of the required storage space based on the allocated storage space for the second instance and the required storage space.

14. The electronic device according to claim 13, wherein determining allocation of the required storage space comprises:
   allocating, if determining that the sum of the size of the allocated storage space and the size of the required storage space is smaller than or equal to the predetermined size, the required storage space to the second instance; and
   releasing, if determining that the sum of the size of the allocated storage space and the size of the required storage space is larger than the predetermined size, at least part of the allocated storage space for the required storage space.

15. A computer program product tangibly stored on a non-volatile computer-readable medium and comprising machine-executable instructions, wherein the machine-executable instructions, when executed by a machine, cause the machine to perform steps of a method for managing a machine learning model, the method comprising:
   determining a first instance of a current version for the machine learning model and a second instance of an upgraded version for the machine learning model, the first instance executing a service for processing data, wherein the first instance and the second instance are configured to run at least in part concurrently with one another on one or more graphics processing units to provide uninterrupted access to the service for processing data using one of the first instance and the second instance in conjunction with migration of the service from the first instance to the second instance;
   adjusting respectively, if determining that the service is to be migrated from the first instance to the second instance, a first allocation policy for storage space of the first instance and a second allocation policy for storage space of the second instance to a first target policy and a second target policy, wherein the first target policy is used to phase out storage space and the second target policy is used to phase in storage space;
   reclaiming allocated storage space for the first instance based on the first target policy; and
   allocating required storage space for the second instance based on the second target policy to realize migration of the service;
   wherein the storage space comprises memory resources of the one or more graphics processing units;
   wherein the first target policy is more restrictive with regard to usage of the memory resources of the one or more graphics processing units than the first allocation policy; and
   wherein the second target policy is less restrictive with regard to usage of the memory resources of the one or more graphics processing units than the first target policy.

16. The computer program product according to claim 15, wherein adjusting the first allocation policy and the second allocation policy to the first target policy and the second target policy respectively comprises:
   determining a first allocation policy for the first instance and a second allocation policy for the second instance;
   adjusting the first allocation policy of the first instance as the first target policy; and
   adjusting the second allocation policy of the second instance as the second target policy.

17. The computer program product according to claim 15, wherein the method further comprises:
   if determining that the migration is completed,
   replacing the first target policy with the first allocation policy for use by the first instance; and
   replacing the second target policy with the second allocation policy for use by the second instance.

18. The computer program product according to claim 15, wherein reclaiming allocated storage space for the first instance comprises:
   determining a sequence of nodes corresponding to operations associated with the machine learning model, the nodes being sorted according to an order of the corresponding operations;
   determining a current node corresponding to an operation being executed in the first instance;
   determining, from the sequence, a previous node previous to the current node; and
   reclaiming storage space for the operation corresponding to the previous node in the first instance.

19. The computer program product according to claim 18, wherein reclaiming allocated storage space for the first instance further comprises:
    reclaiming, after completing calculation of the current node, the storage space for the operation corresponding to the current node in the first instance.

20. The computer program product according to claim 15, wherein allocating required storage space for the second instance comprises:
    allocating, if determining that the second allocation policy for the second instance is a policy for allocating storage space according to needs of an instance, the required storage space to the second instance by using the second allocation policy as the second target policy; and
    determining, if determining that the second allocation policy for the second instance is a policy for allocating storage space of a predetermined size to an instance, allocation of the required storage space based on the allocated storage space for the second instance and the required storage space.

\* \* \* \* \*